(12) United States Patent
Lai

(10) Patent No.: US 8,246,194 B2
(45) Date of Patent: Aug. 21, 2012

(54) ILLUMINATION APPARATUS

(75) Inventor: Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 195 days.

(21) Appl. No.: 12/768,756

(22) Filed: Apr. 28, 2010

(65) Prior Publication Data

US 2011/0019393 A1 Jan. 27, 2011

(30) Foreign Application Priority Data

Jul. 21, 2009 (CN) .......................... 2009 1 0304633

(51) Int. Cl.
*F21L 13/00* (2006.01)

(52) U.S. Cl. ................ 362/183; 362/153.1; 362/249.02; 362/311.02

(58) Field of Classification Search .................. 362/183, 362/240, 244, 249.02, 246, 311.02, 311.05, 362/645, 310, 101, 157, 158, 153, 153.1, 362/800

See application file for complete search history.

(56) References Cited

U.S. PATENT DOCUMENTS

| | | | | |
|---|---|---|---|---|
| 2,454,332 A | * | 11/1948 | Mitchell et al. | 362/337 |
| 5,152,601 A | * | 10/1992 | Ferng | 362/183 |
| 5,224,773 A | * | 7/1993 | Arimura | 362/227 |
| 5,309,656 A | * | 5/1994 | Montgomery | 40/442 |
| 6,048,083 A | * | 4/2000 | McDermott | 362/337 |
| 6,086,220 A | * | 7/2000 | Lash et al. | 362/244 |
| 6,573,659 B2 | * | 6/2003 | Toma et al. | 315/149 |
| 6,782,552 B1 | * | 8/2004 | Stiegler et al. | 725/74 |
| 6,905,228 B1 | * | 6/2005 | Takeyasu et al. | 362/237 |
| 6,942,361 B1 | * | 9/2005 | Kishimura et al. | 362/240 |
| 6,948,830 B1 | * | 9/2005 | Petrick | 362/229 |
| 7,192,155 B2 | * | 3/2007 | Morrow et al. | 362/153.1 |
| 7,357,533 B2 | * | 4/2008 | McDermott et al. | 362/285 |
| 2008/0068837 A1 | * | 3/2008 | Chiu et al. | 362/244 |
| 2010/0327782 A1 | * | 12/2010 | Chen | 315/362 |

FOREIGN PATENT DOCUMENTS

| | | |
|---|---|---|
| CN | 2544173 Y | 4/2003 |
| CN | 2692485 Y | 4/2005 |

* cited by examiner

*Primary Examiner* — John A Ward
(74) *Attorney, Agent, or Firm* — Altis Law Group, Inc.

(57) ABSTRACT

An illumination apparatus for lighting a road surface includes a light source mounted on the road surface, an electrical power storage device, a solar cell, and a transparent package. The light source includes at least one light emitting diode and an optical element optically coupled to the light emitting diode. The optical element deflects the light from the light emitting diode to opposite sides of the light source along the road surface. The included angles between the light from the optical element and the road surface are asymmetric at the opposite sides of the light source. The light source and the solar cell are encapsulated in the transparent packing.

12 Claims, 12 Drawing Sheets

ILLUMINATION APPARATUS

BACKGROUND

1. Technical Field

The disclosure relates to illumination, and particularly to an illumination apparatus providing glare prevention.

2. Description of the Related Art

Light emitting diodes' (LEDs) many advantages, such as high luminosity, low operational voltage, low power consumption, compatibility with integrated circuits, easy driving, long term reliability, and environmental friendliness have promoted their wide use as a light source.

Joseph Bielecki et al in IEEE, 23$^{rd}$ IEEE SEMI-THERM Symposium, "Thermal Considerations for LED Components in an Automotive Lamp." characterize light emitting diodes as one kind of semiconductor device changing current into light of specific wavelength.

Glare, or unwanted occurrence of bright light, can be direct, where the light is emitted from high luminance or glare source and directly on viewers, with the glare source in the same direction or aligned with the observed object, or indirect, where the glare source is not in the direction of observation, and is usually caused by light reflected from a smooth surface. Referring to FIG. 1, when a light source 101 is above a viewer's eyes 102, in the range of 45° to 85° deflecting from the vertical surface 103 through the eyes 102 of the viewer, the light source 101 causes direct glare at the eyes 102.

Currently, many street light illumination apparatus can create direct glare to drivers. Referring to FIG. 2, light from the street light 201 is emitted toward the road surface. Often the radiation range of the street light 201 on the driving direction along axis X exceeds the radiation range of axis Y perpendicular to axis X, which can increases effectively light utilization efficiency of street light 201. However, the radiation range of axis X of the street light 201 is distributed symmetrically about the center of the street light 201. Therefore, both sides of radiation angle of axis X, θ1 and θ2 are equal. Generally, θ1 and θ2 are both equal to 75° producing direct glare to eyes. The radiation angle here is also known as the half-peak side angle. The half-peak side angle is the angle measured at half of maximum light intensity at both sides of the vertical axis of the road surface. Therefore, the half-peak side angle is the included angle of the light of 50% maximum intensity on the plane from the light source and the vertical axis.

Referring to FIG. 3, on a distribution curve of luminous intensity of the street light 201, point A represents light intensity 50% of the maximum between radiation angle 0° to 90°, and point B represents light intensity of the maximum between radiation angle 0° to 90°. Therefore, the radiation angle θ of street light 201 is almost equal to 70°. Thus, the present street light 201 creates direct glare.

What is needed therefore, is an illumination apparatus with glare prevention overcoming the described limitations.

BRIEF DESCRIPTION OF THE DRAWINGS

Many aspects of the present illumination apparatus can be better understood with reference to the following drawings. The components in the drawings are not necessarily drawn to scale, the emphasis instead being placed upon clearly illustrating the principles of the present illumination device. Moreover, in the drawing, like reference numerals designate corresponding parts throughout the several views.

DETAILED DESCRIPTION

Embodiments of the illumination apparatus are described in detail here with reference to the drawings.

Figure 1:
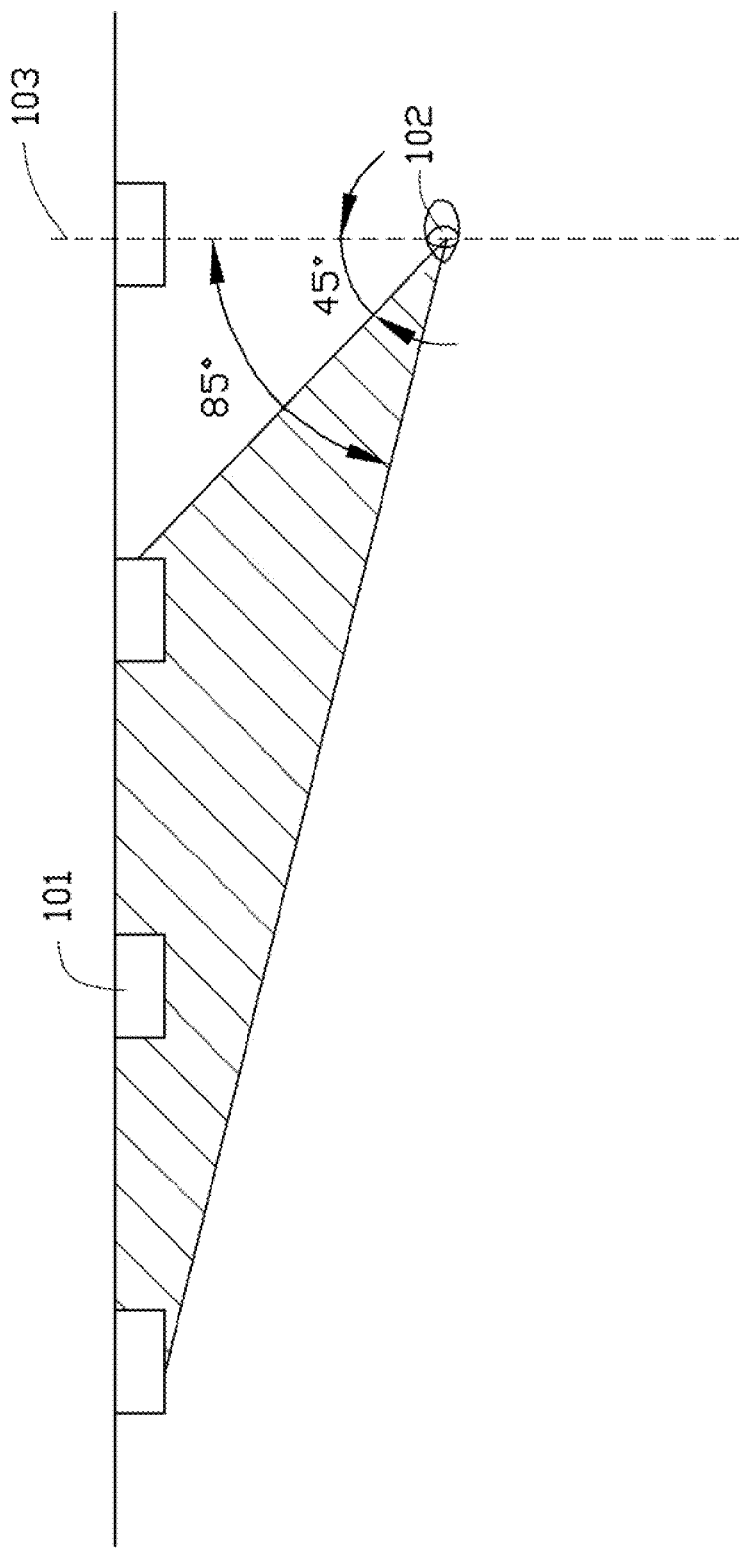
FIG. 1 is a schematic view illustrating common creation of glare, in accordance with prior art.
Figure 2:
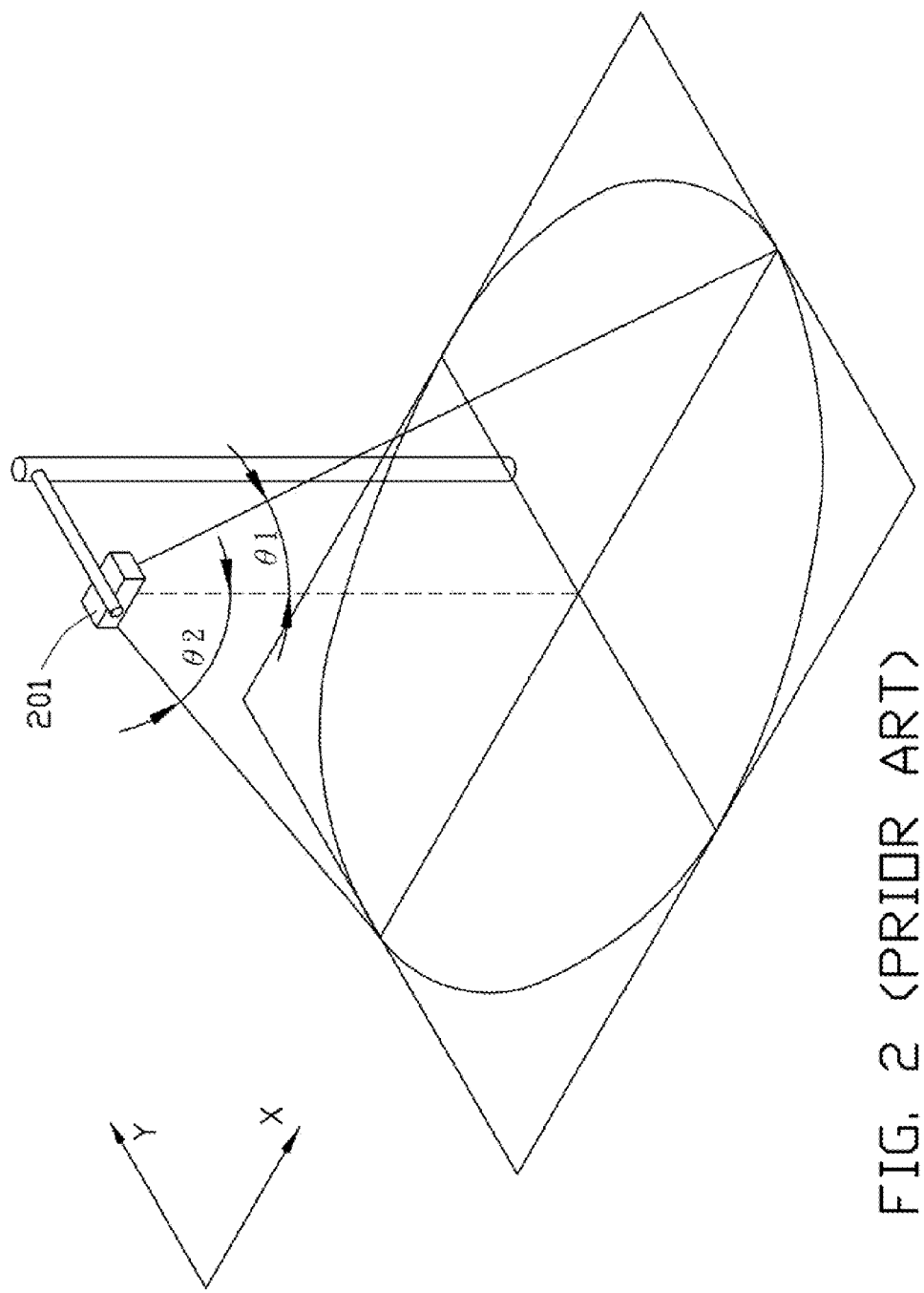
FIG. 2 is a schematic view of a street light illuminating the road surface, in accordance with prior art.
Figure 3:
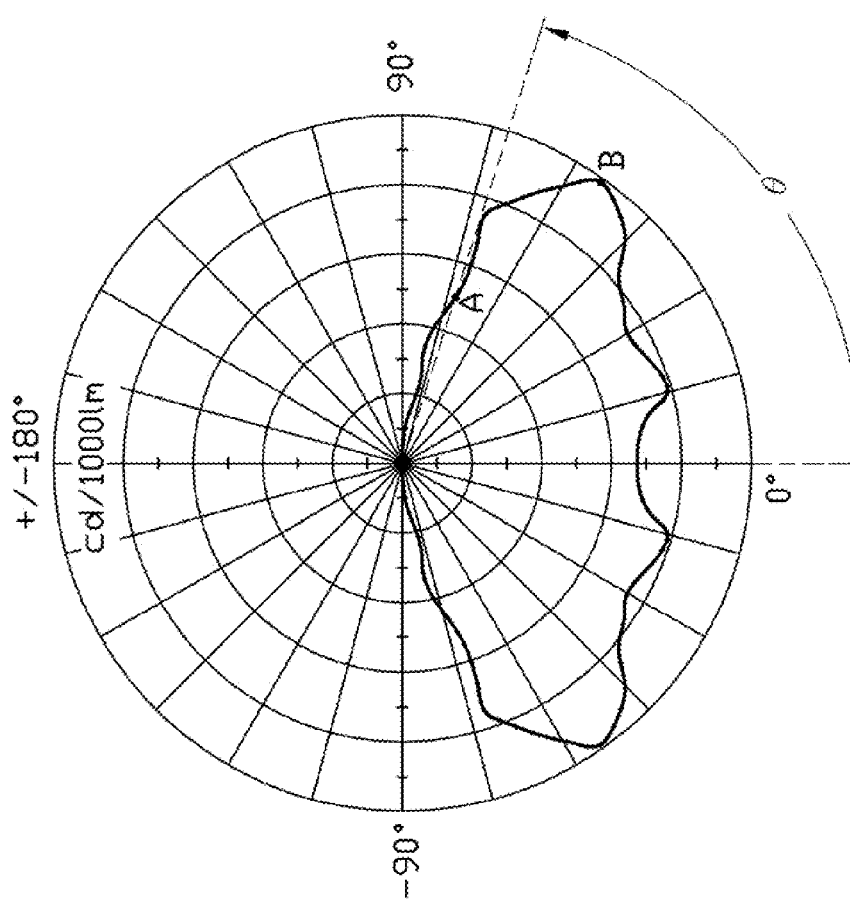
FIG. 3 is a schematic view of a distribution curve of luminous intensity of the street light of FIG. 2.
Figure 4:
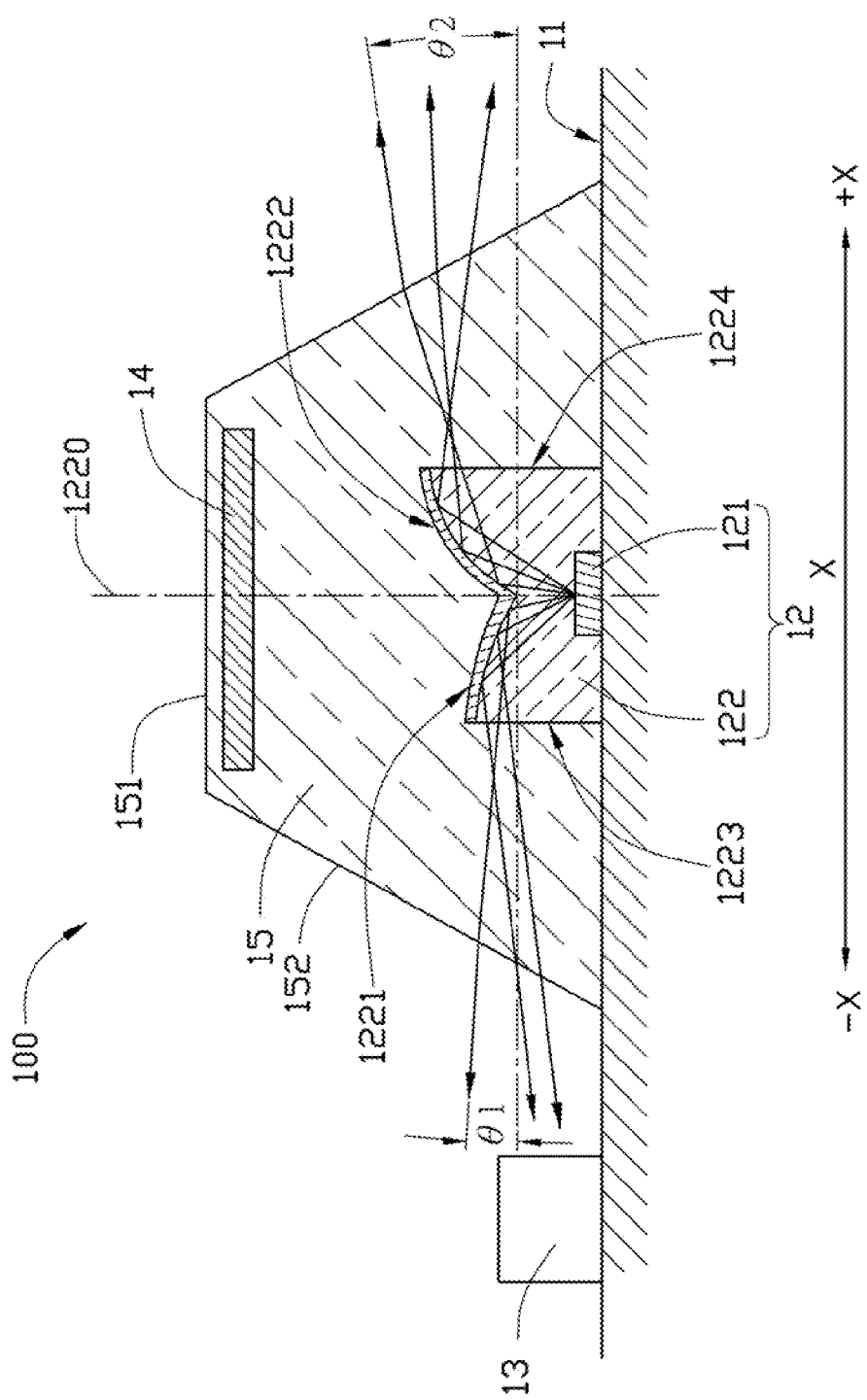
FIG. 4 is a schematic cross section of a first embodiment of an illumination apparatus having a first optical element type.

Referring to FIG. 4, an illumination apparatus 100 in accordance with a first embodiment includes a light source 12, an electrical power storage device 13, a solar cell 14, and a transparent package 15. The light source 12 includes at least one light emitting element 121 and an optical element 122.

The light emitting element 121 can be an LED (light emitting diode), laser, organic light emitting diode, or light emitting diode modules. The road aligns along axis X.

Light from the light emitting element 121 passes through the optical element 122, and is emitted with optical effect. In this embodiment, the light source 12 is mounted on a road surface 11, and the light emitting element 121 emits light upwardly into the optical element 122. The optical element 122 deflects the light from the light emitting element 121 to the side of the light source 12, and then along axis X of the road surface 11.

The optical element 122 has a vertical axis 1220 perpendicular to the extension of axis X of the road surface 11. The extension of axis X of the road surface 11 is divided into axis +X and axis −X. The optical element 122 includes funnel-shaped top surfaces 1221 and 1222, and vertical sidewalls 1223 and 1224. The light emitting element 121 is mounted on the geometric center of the bottom of the optical element 122. The light emitting element 121 is opposite to the top surfaces 1221 and 1222. The top surfaces 1221 and 1222 are quadric surfaces. In this embodiment, the top surfaces 1221 and 1222 of the optical element 122 are parabolic surfaces. The angle of the top surface 1221 is less than the angle of the top surface 1222. The inner surfaces of the top surfaces 1221 and 1222 are reflective. The height of the vertical sidewall 1224 relative to the road surface 11 is higher than the height of the vertical sidewall 1223.

Electrical power storage device 13, such as a battery, is electrically connected to the light emitting element 121.

The transparent package 15 is mounted on the road surface 11, with the light source 12 and the solar cell 14 encapsulated therein. In this embodiment, the transparent package 15 is a truncated cone having a top surface 151 and a side surface 152 surrounding the top surface 151. The light source 12 is in the bottom of the transparent package 15. The solar cell 14 is mounted on top of the transparent package 15 relative to the light source 12 and is adjacent to the top surface 151. The solar cell 14 can directly absorb sunlight.

In this embodiment, the light is emitted from light emitting element 121 to the top surface 1221, experiences total reflection therefrom, and then passes through the vertical sidewall 1223 to the side surface 152 of the transparent package 15, is refracted at the sidewall 152 and provided to the road surface 11. The included angle between light incident on the road surface 11 and the axis −X of the road surface 11 is θ1. The light from the light emitting element 121 is emitted to the top surface 1222, and experiences total reflection at the top surface 1222, and then passes through the vertical sidewall 1224, and is emitted to the sidewall 152 of the transparent package 15, and experiences refraction at the sidewall 152, before being emitted to the road surface 11. The included angle between the light emitted to the road surface 11 and the axis +X of the road surface 11 is θ2. The vertical sidewall 1224 of the optical element 122 is higher than that of the vertical sidewall 1223. Accordingly, light from the light emitting element 121 passes through the optical element 122 and the transparent package 15 and is emitted along road surface 11, and the distribution of the optical field of both sides of the light source 12 is asymmetric. Thus, θ1 is less than θ2. Therefore, the light from the illumination apparatus 100 is not directly incident upon viewers moving along axis −X from left of FIG. 4, but the light is mostly emitted to the road surface 11 along axis −X. Furthermore, along axis +X toward right of FIG. 4, departing drivers have clear vision since the light reflected by the top surface 1222 and from the vertical side wall 1224 has a higher angle of elevation (i.e., θ2).

Figure 5:
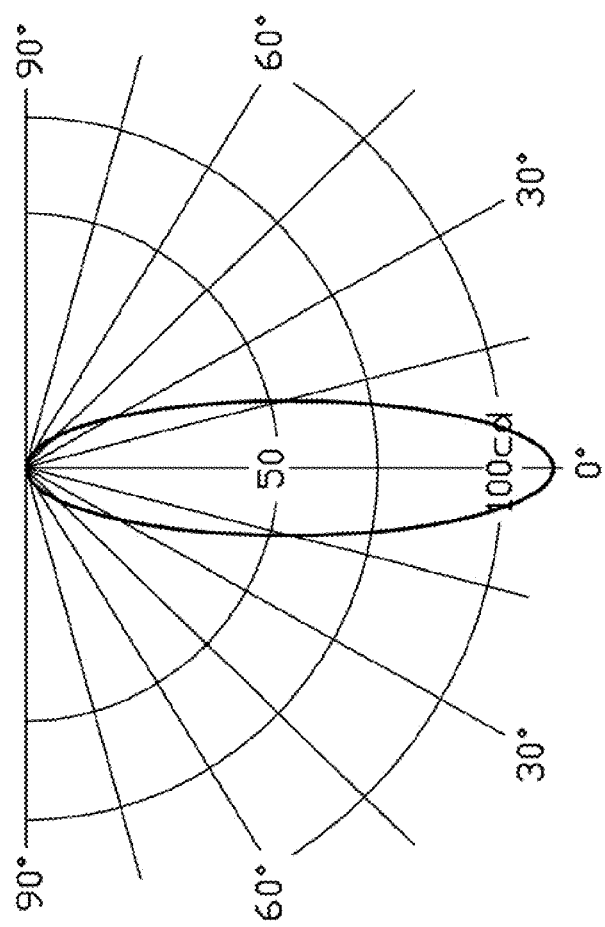
FIG. 5 is a schematic view of a distribution curve of luminous intensity obtained by light emitted from a side of the illumination apparatus of FIG. 4.
Figure 6:
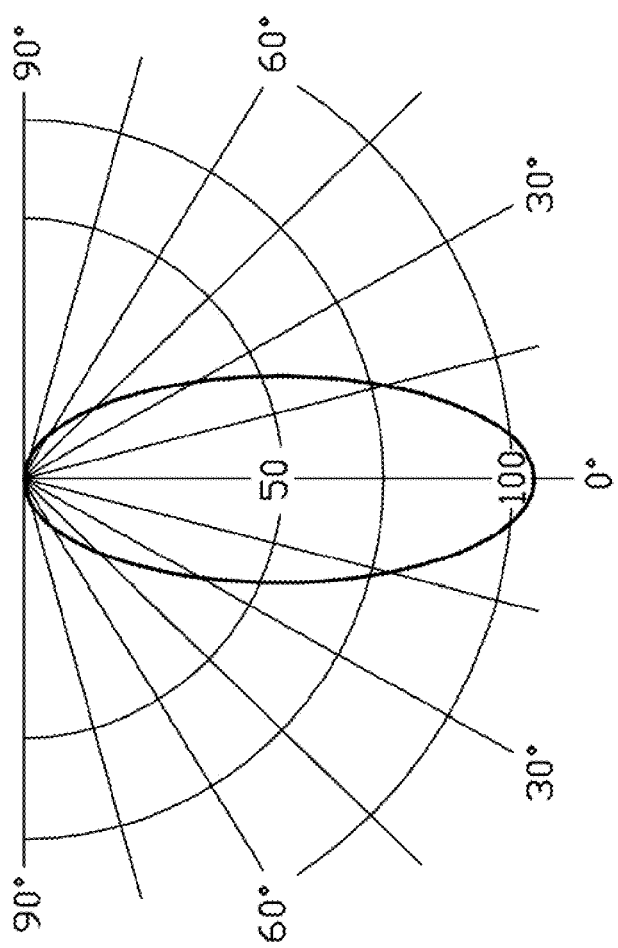
FIG. 6 is a schematic view of a distribution curve of luminous intensity obtained by light emitted from an opposite side of the illumination apparatus of FIG. 4.

Referring to FIGS. 5 and 6, in this embodiment, θ1 and θ2 are within a predetermined range, such as −15°<θ1<+15° and −30°<θ2<+30°, wherein the distribution curve of luminous intensity is formed by light reflected by the top surfaces 1221, 1222 of the light emitting element 121. More preferably, θ1 and θ2 are within a predetermined range, with −10°<θ1<+10° and −20°<θ2<+20°. The included angles θ1 and θ2 are angles between the light from the optical element 122 having 50% of the maximum luminous intensity and the road surface 11.

The optical element 122 of the light source 12 can alternatively take other structures which are asymmetrical, not being limited to that of this embodiment. Thus, the included angle θ between light from the light source 12 and the road surface 11 is in the predetermined range, and the distribution of the light at both sides of the road surface 11 is asymmetrical. Following are several exemplary light sources with different optical elements.

Figure 7:
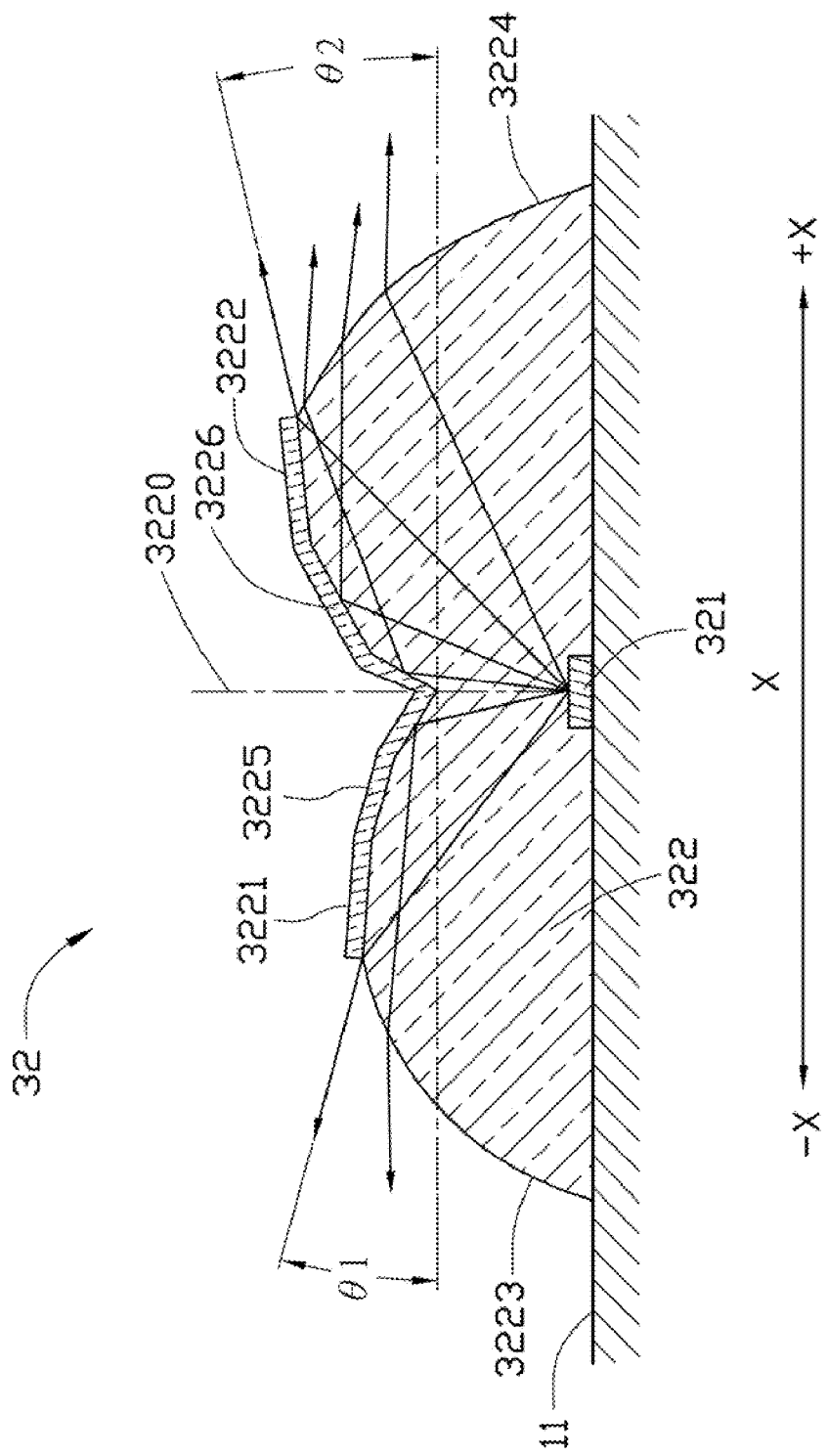
FIG. 7 is a schematic cross section of the first embodiment of the illumination apparatus having a second optical element type.

Referring to FIG. 7, a light source 32 includes a light emitting element 321, and an optical element 322 optically coupled with the light emitting element 321. The optical element 322 has a vertical axis 3220 perpendicular to the extension axis X of the road surface 11. The extension axis of the road surface 11 is divided into axis +X and axis −X. The optical element 322 includes a funnel-shaped first top surface 3221, a funnel-shaped second top surface 3222, a first side surface 3223, and a second side surface 3224 opposite to the first side surface 3223. The light emitting element 321 is mounted on the geometric center of the bottom of the optical element 322 opposite to the first top surface 3221 and the second top surface 3222. The first top surface 3221 and the second top surface 3222 are curved surfaces having several planes of different slopes. In this embodiment, the slopes of the first top surface 3221 and the second top surface 3222 gradually decrease outward from inside. The first side surface 3223 and the second side surface 3224 are smooth curved surfaces, and the first side surface 3223 relative to the road surface 11 is shorter than the second side surface 3224.

The light from the light emitting element 321 is emitted to the first top surface 3221 and the second top surface 3222, and experiences total reflection at the first top surface 3221 and the second top surface 3222, wherein the light emitted is nearly perpendicular to the vertical axis 3220.

In other words, a major part of the light from the light emitting element 321 is emitted toward the first side surface 3223 and the second side surface 3224 and at an angle nearly of 90° with the vertical axis 3220.

Most of the light passing through the first side surface 3223 of the optical element 322 is parallel to the extension axis −X of the road surface 11, wherein the included angle between the light from the optical element 322 having 50% of the maximum luminous intensity and the road surface 11 is θ1.

Most of the light passing through the second side surface 3224 of the optical element 322 is parallel to the extension axis +X of the road surface 11, wherein the included angle between the light from the optical element 322 having 50% of the maximum luminous intensity and the road surface 11 is θ2.

Since the first side surface 3223 of the optical device 322 relative to the road surface 11 is shorter than the second side surface 3224, the light from the light emitting element 321 passing through the optical element 322 is emitted with the optical field distribution of both sides of the light source 32 along the road surface 11 asymmetrically. The included angles θ1 and θ2 are between the light from the light emitting element 321 passing through the optical element 322 and the road surface 11. θ1 is less than θ2. θ1 and θ2 are within the predetermined range, such as −10°<θ1<+10° and −20°<θ2<+20°. The included angles θ1 and θ2 are between the light from optical element 322 having 50% of the maximum luminous intensity on the plane and the road surface 11. Furthermore, a reflector 3225 can be mounted on the first top surface 3221 of the optical element 322 and a reflector 3226 on the second top surface 3222 of the optical element 322 to increase reflection efficiency.

Figure 8:
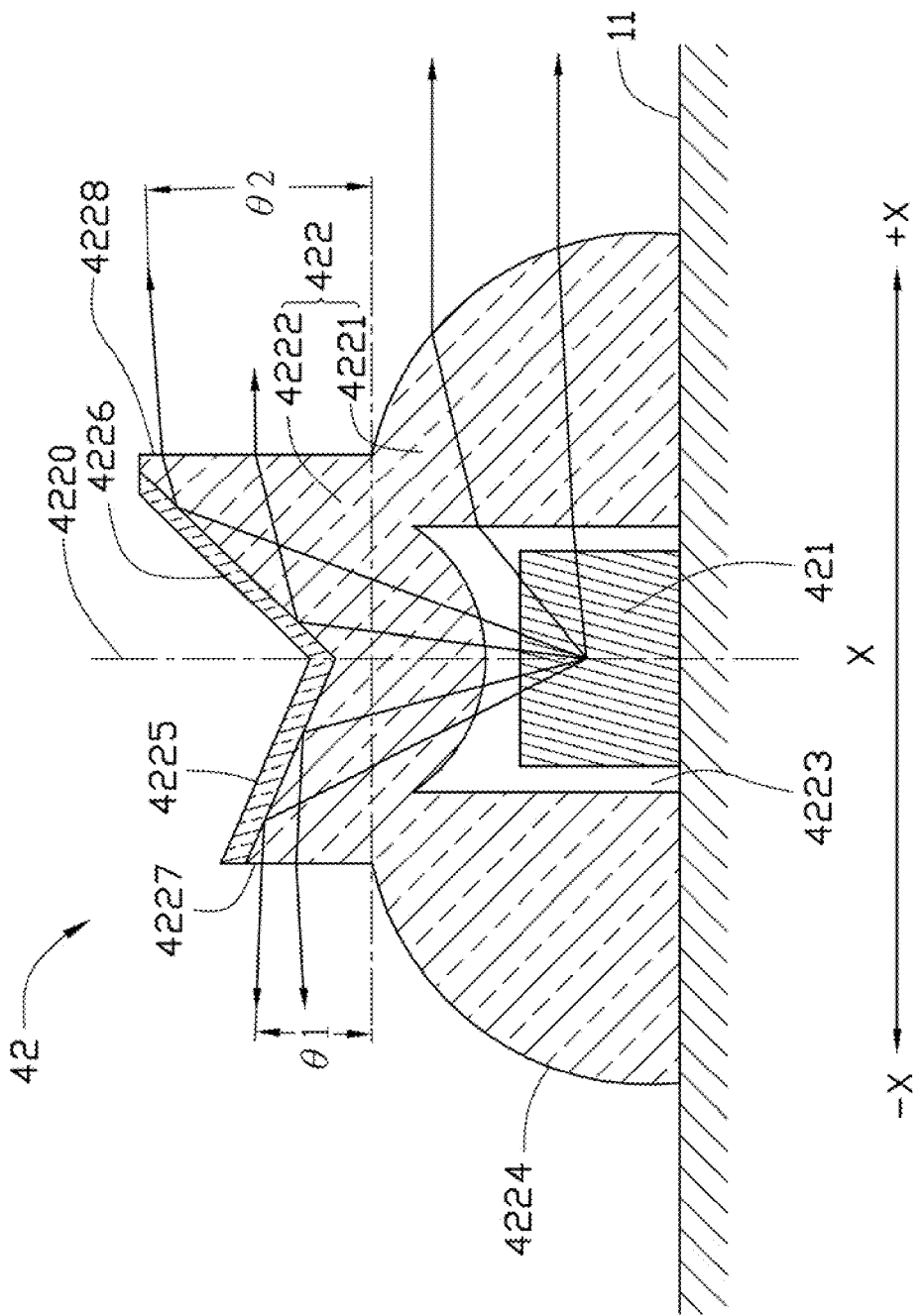
FIG. 8 is a schematic cross section of the first embodiment of the illumination apparatus having a third optical element type.

Referring to FIG. 8, a light source 42 includes a light emitting element 421 and an optical element 422 optically coupled with the light emitting element 421. The optical element 422 has a vertical axis 4220 perpendicular to the extension axis X of the road surface 11. The extension axis of the road surface 11 is divided into axis +X and axis −X. The optical element 422 includes a bottom portion 4221 and a top portion 4222. The outer surface 4224 of the bottom portion 4221 is a smooth curved surface. The center of the bottom portion 4221 has a cavity 4223 for receiving the light emitting element 421. The top portion 4222 includes funnel-shaped cone top surfaces 4225 and 4226, vertical sidewalls 4227 and 4228, and the inner surfaces of the top surfaces 4225 and 4226 are reflection surfaces.

The light from the light emitting element 421 passes through the bottom surface of the optical element 422 defining the cavity 4223 and enters the optical element 422, with most of the light entering the bottom portion 4221 almost 90° with the vertical axis 4220 and emitted through the outer surface 4224 after being refracted by the outer surface 4224. A part of the light which enters the top portion 4222 is reflected by the top surfaces 4225, 4226. The light entering the top portion 4222 experiences total reflection at the top surfaces 4225 and 4226, and is emitted through the vertical sidewalls 4227 and 4228 almost at 90° with the vertical axis 4220.

Therefore, most of the light from the optical element 422 is parallel with the extension axis +X or −X of the road surface 11. Little light deflects from the extension axis of the road surface 11 with a small angle. The included angle between the light from the optical element 422 and the extension axis −X is θ1. The included angle between the light from the optical element 422 and the extension axis +X is θ2.

The vertical sidewall 4227 of the optical element 422 relative to the road surface 11 is shorter than vertical sidewall 4228. Thus, light from the light emitting element 421 passes through the optical element 422, and is then emitted along the road surface 11. The distribution of light is asymmetric at both sides of the light source 42. Thus, the included angles θ1 and θ2 are between the light from the light emitting element 421 passing through the optical element 422 and the road surface 11. θ1 is less than θ2. θ1 and θ2 are within the predetermined range, such as −10°<θ1<+10° and −20°<θ2<+20°. The included angles θ1 and θ2 are between the light from optical element 422 having 50% of the maximum luminous intensity on the plane and the road surface 11.

Figure 9:
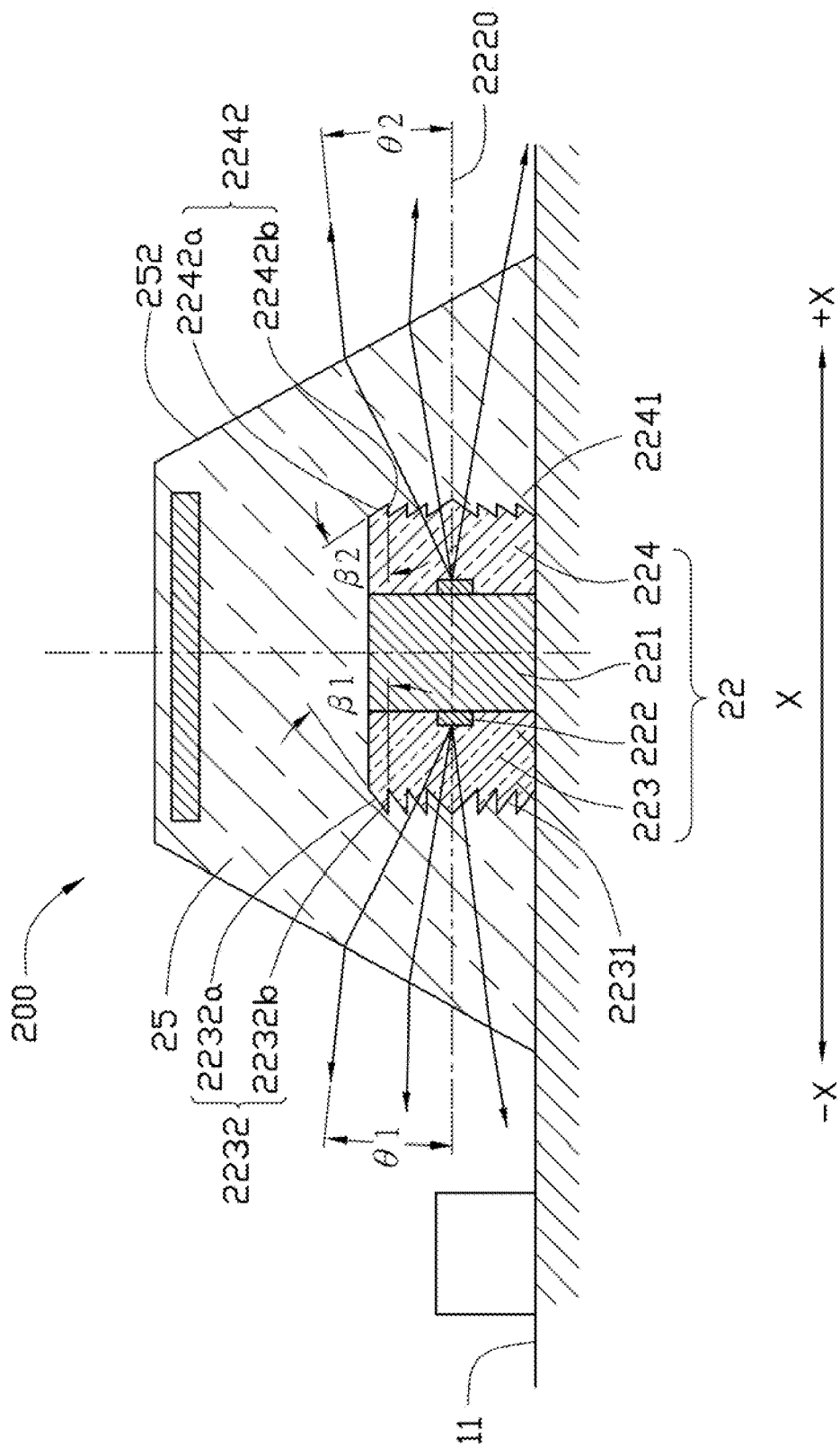
FIG. 9 is a schematic cross section of a second embodiment of the illumination apparatus having a first light source type.

Referring to FIG. 9, in a second embodiment, the illumination apparatus 200 of the first light source type illuminates the road surface 11. The extension axis of the road surface is X. The illumination apparatus 200 differs from the first embodiment only in that the light source 22 includes a cylindrical substrate 221 and a plurality of light emitting elements 222, and two optical elements 223 and 224 optically coupled to the light emitting elements 222. The optical element 223 relative to the road surface 11 is shorter than optical element 224 relative to the road surface 11. The optical elements 223 and 224 and the plurality of the light emitting elements 222 are mounted on the peripheral side surface of the substrate 221 and form a ring-like light source 22. The light from the light emitting element 222 passes through the optical elements 223 and 224, and then emits along the side direction of the light source 22.

Figure 10:
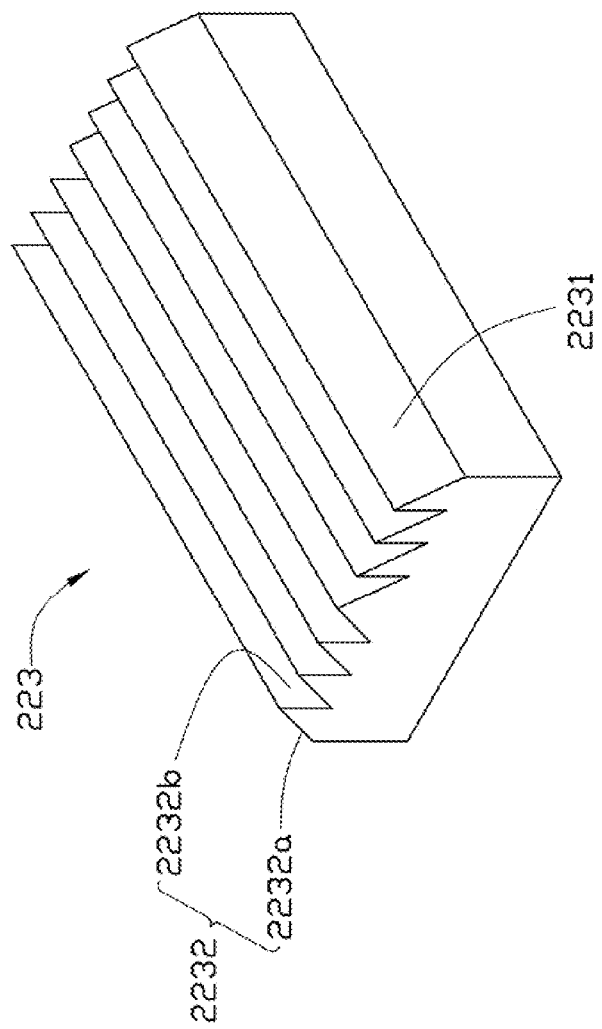
FIG. 10 is a schematic view of an optical element of the second embodiment of the illumination apparatus of FIG. 9 having an acute angle β1.
Figure 11:
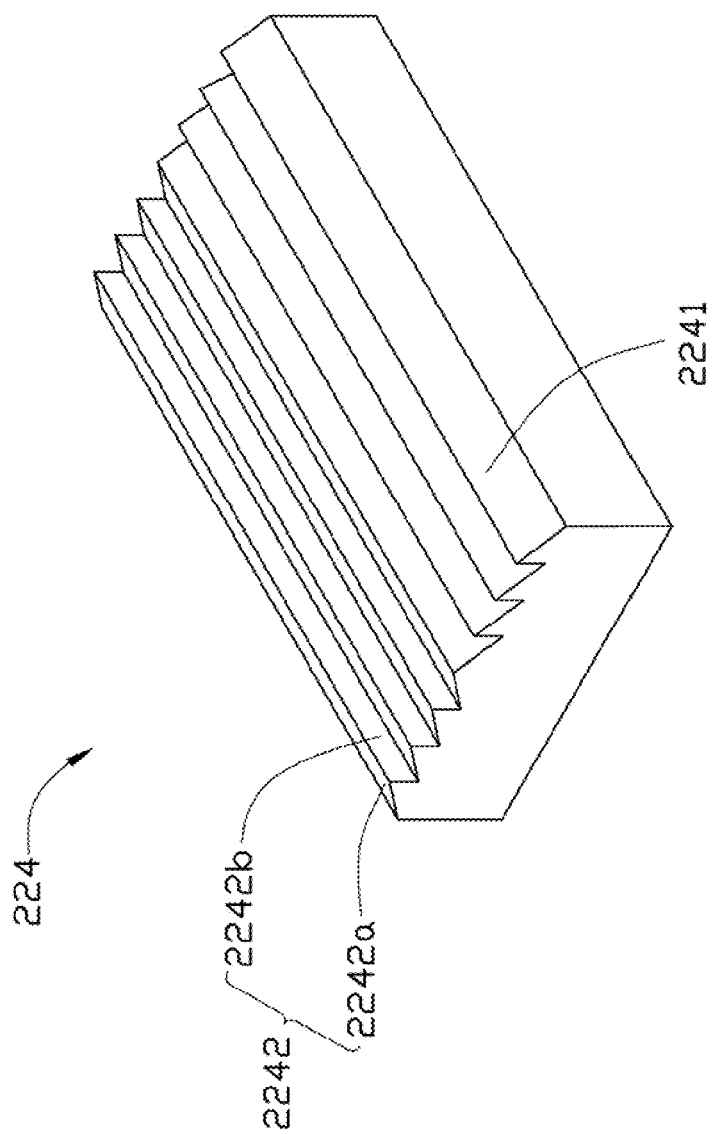
FIG. 11 is a schematic view of another optical element of the second embodiment of the illumination apparatus of FIG. 9 having an acute angle β2.

The optical elements 223 and 224 have a symmetrical center axis 2220 parallel with extension axis X of the road surface 11. The extension axis of the road surface 11 is divided into axis +X and axis −X. Also referring to FIG. 10 and FIG. 11, the optical element 223 has a light emitting surface 2231 opposite to the light emitting element 222. The light emitting surface 2231 has a plurality of sawtoothed micro-structures 2232, although the micro-structures 2232 are not limited to a sawtoothed configuration, and can be other shapes, such as a trapezoid sawtoothed protrusion, or other. Each micro-structure 2232 includes a first surface 2232a and a second surface 2232b connecting to the first surface 2232a. The angle between the first surface 2232a and the second surface 2232b is an acute angle β1. The micro-structure 2232 distributes light on the light emitting surface 2231 uniformly. The optical element 224 has a light emitting surface 2241 opposite to the light emitting surface 2231 of the light emitting element 222. The light emitting surface 2241 has a plurality of sawtoothed micro-structures 2242, although the micro-structures 2242 are not limited to a sawtoothed configuration, and can be of other shapes, such as a trapezoid sawtoothed protrusion, or other. The micro-structure 2242 includes a first surface 2242a and a second surface 2242b connecting to the first surface 2242a. The angle between the first surface 2242a and the second surface 2242b is an acute angle β2. β2 exceeds β1. The micro-structure 2242 distributes light on the light emitting surface 2241 uniformly.

In this embodiment, the light from the light emitting elements 222 is emitted to the light emitting surfaces 2231 and 2241 of the optical elements 223 and 224, enters the transparent package 25, and refracts at side surface 252 of the illumination apparatus 200, and then is emitted to the extension axis +X or −X of the road surface 11. Therefore, the included angle between the light and the extension axis +X is θ1. The included angle between the light and the extension axis −X is θ2. The included angle between the first surface 2232a and the second surface 2232b of the micro-structure 2232 of the light emitting surface 2231 of the optical element 223 is β1. The included angle between the first surface 2242a and the second surface 2242b of the micro-structure 2242 of the light emitting surface 2241 of the optical element 224 is β2. β1 is less than β2.

Therefore, the angle of the first surface 2232a of the micro-structure 2232 of the light emitting surface 2231 of the optical element 223 exceeds the angle of the first surface 2242a of the micro-structure 2242 of the light emitting surface 2241 of the optical element 224.

The convergence of the light from the optical element 223 which is emitted to the road surface 11 is better than the convergence of the light from the optical element 224. Hence, the light from the light emitting elements 222 passes through the optical element 223 and the transparent package 25 and emits along the road surface 11. The distribution of light field of both sides of the light source 22 is asymmetric. θ1 is less than θ2. The light from illumination apparatus 200 is not emitted directly to the view of oncoming traffic (from left of FIG. 9 along axis −X). In the leaving direction (toward right of FIG. 9 along axis +X), the driver can see clearly of the front road surface.

In this embodiment, θ1 and θ2 are in the predetermined range. For example, −10°<θ1<+10° and −20°<θ2<+20°. The included angle θ1 and θ2 are between the light from the optical elements 223 and 224 having 50% of the maximum luminous intensity on the plane and the road surface 11.

Figure 12:
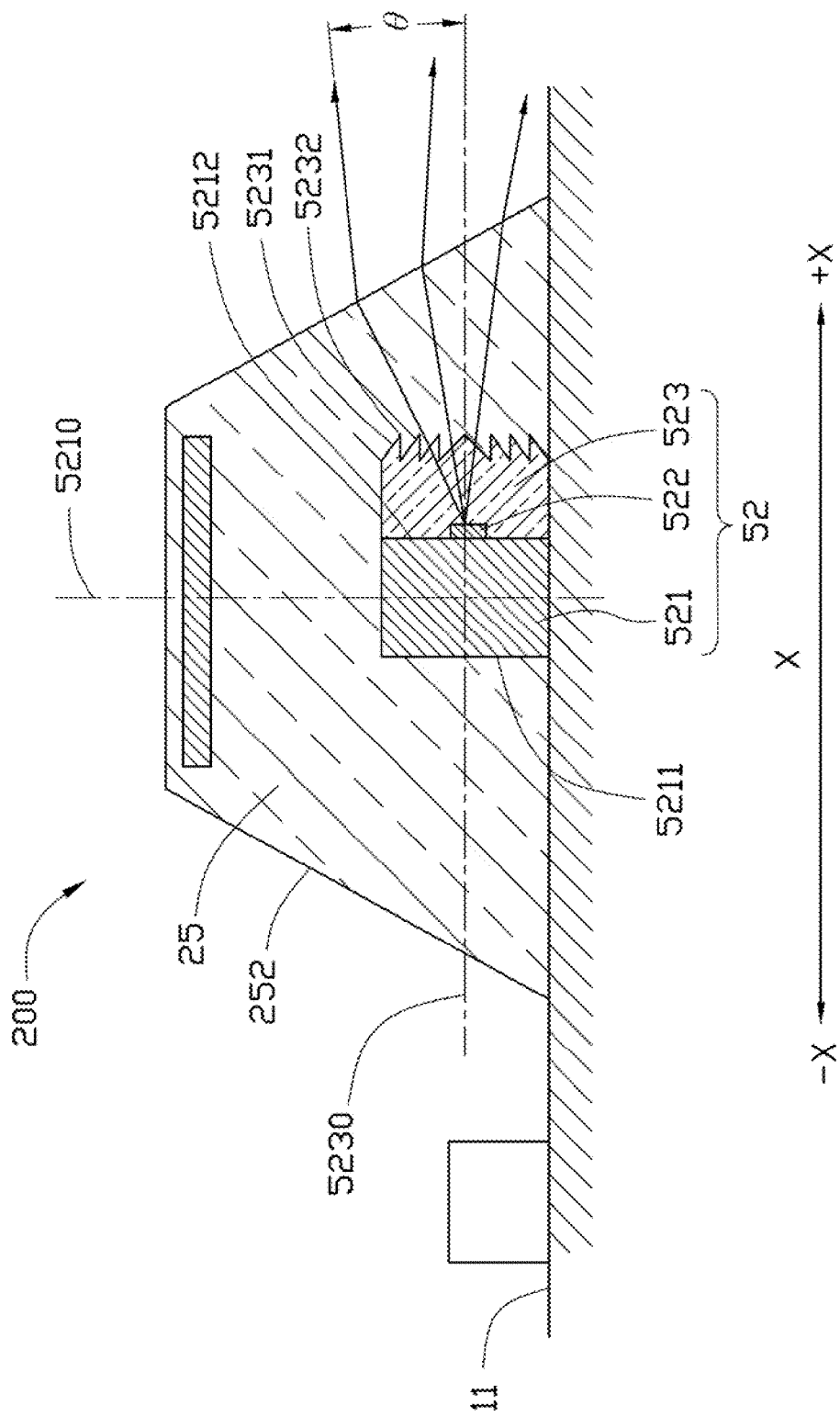
FIG. 12 is a schematic cross section of the second embodiment of the illumination apparatus having a second light source type.

Referring to FIG. 12, a light source 52 illuminates the road surface 11. The light source 52 includes a cylindrical substrate 521, at least one light emitting element 522, and an optical element 523 optically coupled to the light emitting element 522. The cylindrical substrate 521 has a symmetrical center axis 5210 perpendicular to the road surface 11, a first side surface 5211, a second side surface 5212 symmetrical about the symmetrical center axis 5210. The extension axis of the second surface 5212 is perpendicular to the extension axis +X of the road surface 11. The at least one the light emitting element 522 and the optical element 523 are mounted on the second side surface of the substrate 521 and form a semi-ring light source 52. Therefore, the light from the light emitting element 522 passes through the optical element 523, and then is emitted from at side direction of the light source 52.

The optical element 523 has a symmetrical center axis 5230 parallel to the extension axis X of the road surface 11. The extension axis of the road surface 11 is divided into −X and +X. The optical element 523 has a light emitting surface 5231 opposite to the light emitting element 522. The light emitting surface 5231 has a plurality of sawtoothed micro-structures 5232, although the micro-structures 5232 are not limited to a sawtoothed configuration, and can be of other shapes, such as a trapezoid sawtoothed protrusion, or other. The micro-structure 5232 distributes light on the light emitting surface 5231 uniformly and provides effect of light homogenization. The light from the light emitting element 522 is largely emitted to the light emitting surface 5231 of the optical element 523, and enters the transparent package 25, and then refracts at the side surface 252 of the illumination apparatus 200, after that the light deflects to the extension axis +X of the road surface 11 and is emitted to the road surface 11. Therefore, the included angle between the light and the extension axis +X of the road surface is θ. θ is in the predetermined range. For example, −20°<θ<+20°. The included angle θ is between the light from optical element 523 having 50% of the maximum luminous intensity on the plane and the road surface 11.

The light emitting element 522 is mounted on the second side surface 5212 of the substrate 521. Therefore, the light from the light source 52 passes through the optical element 523 and forms light field only in the extension axis +X of the road surface 11. Thus, the light does not cause direct glare at the eyes of driver in the car of coming direction (from left of FIG. 12 along axis −X).

While certain embodiments have been described and exemplified above, various other embodiments from the foregoing disclosure will be apparent to those skilled in the art. The disclosure is not limited to the particular embodiments described and exemplified but is capable of considerable variation and modification without departure from the scope of the appended claims.

What is claimed is:

1. An illumination apparatus for lightening a road surface comprising:
    a light source configured for being mounted on the road surface, comprising at least one light emitting element and an optical element, wherein the light from the at least one light emitting element passes through the optical element and deflects to opposite sides of the light source, the light is emitted along an extension axis of the road surface asymmetrically distributed on the opposite sides of the light source along the extension axis of the road surface;
    an electrical power storage device, electrically connecting with the at least one light emitting element;
    a solar cell, electrically connecting with the electrical power storage device to convert sunlight into electricity stored in the electrical power storage device; and
    a transparent package, which encapsulates the light source and the solar cell therein;
    wherein the transparent package is a truncated cone-shape with a top surface and a side surface surrounding the top surface, the light source is mounted on the bottom of the transparent package and the solar cell is mounted on the top portion of the transparent package near the top surface of the transparent package.

2. The illumination apparatus of claim 1, wherein an included angle between the light from one side of the light source and the extension axis of the road surface is not less than −20° and not greater than 20°, and an included angle between the light from the other side of the light source and the extension axis of the road surface is not less than −10° and not greater than 10°.

3. The illumination apparatus of claim 1, wherein an included angle between the light from one side of the light source and the extension axis of the road surface is not less than −30° and not greater than 30°, and an included angle between the light from the other side of the light source and the extension axis of the road surface is not less than −15° and not greater than 15°.

4. The illumination apparatus of claim 1, wherein the optical element includes a funnel-shaped top surface and two vertical sidewalls of different heights, wherein the top surface is totally reflective, and the at least one light emitting element is mounted on the center of the bottom of the optical element and opposite to the top surface.

5. The illumination apparatus of claim 1, wherein the optical element includes a funnel-shaped top surface and two sidewalls of different heights, the top surface is a curved surface comprising a plurality of different-angled planes, the at least one light emitting element is mounted on the center of bottom of the optical element and opposite the top surface, wherein the top surface provides a total reflection of the light and each of the sidewalls has a smooth curved surface.

6. The illumination apparatus of claim 1, wherein the optical element includes a bottom and a top portion, the center of the bottom portion comprises a cavity receiving the at least one light emitting element, the outer surface of the bottom portion is a smooth curved surface, the top portion includes a funnel-shaped cone top surface and two vertical sidewalls of different heights, and the cone top surface is totally reflective.

7. The illumination apparatus of claim 1, wherein the optical element further includes a reflector, the optical element has a funnel-shaped top surface and a sidewall surrounding the top surface, and the reflector is mounted on the funnel-shaped top surface.

8. The illumination apparatus of claim 1, wherein the light source further includes a substrate on which the light source is mounted and to which the at least one light emitting element is electrically connected, and the light source, the solar cell and the substrate are encapsulated in the transparent package.

9. The illumination apparatus of claim 8, wherein the optical device includes a light emitting surface opposite the at least one light emitting element, the light emitting surface comprises a plurality of micro-structures, and the microstructure uniformly distributes light on the light emitting surface.

10. The illumination apparatus of claim 9, wherein the micro-structures are sawtoothed protrusions, each microstructure including a first surface and a second surface connecting to the first surface, and the first surface and the second surface form an acute angle.

11. An illumination apparatus for lightening a road surface comprising:
    a light source configured for being mounted on the road surface, comprising at least one light emitting element and an optical element, wherein the light from the at least one light emitting element passes through the optical element and deflects to opposite sides of the light source, the light is emitted along an extension axis of the road surface asymmetrically distributed on the opposite sides of the light source along the extension axis of the road surface;
    an electrical power storage device, electrically connecting with the at least one light emitting element;
    a solar cell, electrically connecting with the electrical power storage device to convert sunlight into electricity stored in the electrical power storage device; and
    a transparent package, which encapsulates the light source and the solar cell therein;
    wherein the transparent package has a circular top and the solar cell is mounted in the circular top; and
    wherein the optical element includes a funnel-shaped top surface and two vertical sidewalls of different heights, wherein the top surface is totally reflective, and the at least one light emitting element is mounted on the center of the bottom of the optical element and opposite to the top surface.

12. An illumination apparatus for lightening a road surface comprising:

a light source configured for being mounted on the road surface, comprising at least one light emitting element and an optical element, wherein the light from the at least one light emitting element passes through the optical element and deflects to opposite sides of the light source, the light is emitted along an extension axis of the road surface asymmetrically distributed on the opposite sides of the light source along the extension axis of the road surface;

an electrical power storage device, electrically connecting with the at least one light emitting element;

a solar cell, electrically connecting with the electrical power storage device to convert sunlight into electricity stored in the electrical power storage device; and a transparent package, which encapsulates the light source and the solar cell therein;

wherein the transparent package has a circular top and the solar cell is mounted in the circular top; and wherein the optical element includes a funnel-shaped top surface and two sidewalls of different heights, the top surface is a curved surface comprising a plurality of different-angled planes, the at least one light emitting element is mounted on the center of bottom of the optical element and opposite the top surface, wherein the top surface provides a total reflection of the light and each of the sidewalls has a smooth curved surface.

* * * * *